United States Patent
Irie et al.

[15] 3,703,109
[45] Nov. 21, 1972

[54] ELECTRONIC CONTROL DEVICE FOR AUTOMATIC POWER TRANSMISSION MECHANISM

[72] Inventors: Namio Irie; Masanori Mizote, both of Yokohama, Japan

[73] Assignee: Nissan Motor Company, Limited, Yokohama, Japan

[22] Filed: Sept. 29, 1970

[21] Appl. No.: 76,458

[30] Foreign Application Priority Data

Oct. 1, 1969    Japan .......................44/78362

[52] U.S. Cl. ........................74/866, 74/731, 74/752 D
[51] Int. Cl. ........B60k 21/00, F16h 47/00, F16h 5/42
[58] Field of Search..........................................74/866

[56] References Cited

UNITED STATES PATENTS

| | | |
|---|---|---|
| 3,088,337 | 5/1963 | Bemmann et al. ........74/866 X |
| 3,420,328 | 1/1969 | Johnson et al. ...........74/731 X |
| 3,439,564 | 4/1969 | Scholl et al. .........74/752 D X |
| 3,417,640 | 12/1968 | Schmidt et al...............74/866 |
| 3,446,097 | 5/1969 | Schmidt et al. ..........74/866 X |

*Primary Examiner*—Arthur T. McKeon
*Attorney*—John Lezdey

[57] ABSTRACT

An electronic control device for an automatic power transmission mechanism that serves to effect smooth down shift by setting a neutral interval in accordance with vehicle speed and engine torque. In the control device, a first sensor electronically detects the vehicle speed and a second sensor detects the engine torque. A speed range indicating circuit receives output signals of the first and second sensors to generate a plurality of signals each indicating that the vehicle is running at a particular speed associated with the signal. A neutral interval adjustment circuit is provided to respond to the outputs of the first and second sensors and the plurality of speed range indicating signals so as to generate a pulse the width of which is equal to a proper neutral interval at the particular vehicle speed and engine torque. A command circuit is also provided to operate to hold the automatic power transmission mechanism in a neutral position for the duration of the pulse.

4 Claims, 5 Drawing Figures

3,703,109

ELECTRONIC CONTROL DEVICE FOR AUTOMATIC POWER TRANSMISSION MECHANISM

This invention relates to an electronic control device for an automatic power transmission mechanism and more particularly to an electronic control device that serves to effect smooth down shift by setting a neutral interval in accordance with vehicle speed and engine torque.

In order to provide smooth down shift in an automatic power transmission mechanism having a torque converter a planetary gear system, it is necessary to increase engine revolutions so as to match the reduction gear ratio of a particular speed at which down shift takes place. The extent to which the engine revolutions should be raised increases as the vehicle speed increases. In an ordinary automatic power transmission mechanism, down shift is effected by holding the planetary gear system in a neutral position during a fixed time interval so that the engine revolutions may be increased. This fixed time interval is called the so-called neutral interval, which must be longer for a higher vehicle speed and a lower engine torque. If the neutral interval is shorter than an appropriate value a great shock is experienced during down shift operation, and if, otherwise, the interval is longer, the engine is racing at an extremely high rate. A conventional automatic power transmission mechanism is capable of increasing the neutral interval stepwise for a vehicle speed above a predetermined value, but it cannot vary the neutral interval in accordance with the vehicle speed and the output torque.

It is therefore an object of this invention to provide an electronic control device that serves to effect a proper and smooth down shift in an automatic power transmission mechanism.

It is another object of this invention to provide an electronic control device for an automatic power transmission mechanism that provides a neutral interval varying with the vehicle speed and the output torque.

This invention will be explained hereinafter in more detail in connection with the accompanying drawings, in which.

Although the electronic control device of this invention can be employed in any type of automatic power transmission mechanisms, description will be made in connection with an automatic power transmission mechanism providing three forward speed ratios and one reverse speed ratio. It is assumed here that down shift from third to second speed is provided in the automatic power transmission mechanism, although this invention is not restricted thereto. The automatic power transmission to which the electronic control device of the present invention can be applied is, for example, clearly disclosed in copending U.S. patent application Ser. No. 872,253, now U.S. Pat. No. 3,640,156 filed Oct. 29, 1969, entitled "Control system for automotive automatic transmission" and, therefore the detail description of the same is herein omitted for the sake of simplicity of illustration. The structure which is controlled by the electronic control device of the present invention for actuating the different gear speed ratios is also disclosed in copending U.S. patent application described hereinabove.

Figure 1:
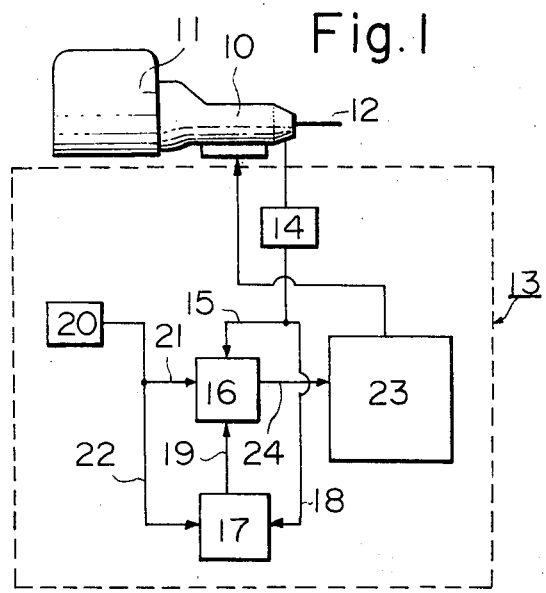
FIG. 1 shows diagrammatically an electronic control device for an automatic power transmission mechanism according to an embodiment of this invention.

Referring now to FIG. 1, there is shown an electronic control device for effecting smooth down shift in an automatic power transmission mechanism, constructed in accordance with this invention. The automatic power transmission mechanism 10 is connected drivably to a vehicle engine 11 and has a driven shaft 12 extending from the end thereof opposite to the engine 11.

The electronic control device generally indicated at 13 includes a first electric means 14 to produce a first variable voltage inversely dependent on vehicle speed. The first electric means 14 may be of any suitable electronic type having a voltage output which decreases as the vehicle speed increases. The first electric means 14 may be of the type which is disclosed in a U.S. Pat. No. 3,433,101 entitled "Electronic arrangement for shifting gears in motor vehicles" or in a U.S. Pat. No. 3,448,640 entitled "Electrical control for automatic transmission". The voltage signal carrying information as to the vehicle speed is supplied through a line 15 to a neutral interval adjustment circuit 16. The voltage signal is also applied to a speed range indicating circuit 17 by way of a line 18. The speed range indicating circuit 17 is a comparator circuit which is adapted to compare the voltage signal at predetermined voltage levels corresponding to predetermined speed levels at which transitions take place between first, second and third speeds, to generate a plurality of speed range signals, each of which indicates that the vehicle is running at a particular speed associated with the signal. The speed range indicating signal is applied to the neutral interval adjustment circuit 16 via a line 19. The electronic control device 13 further includes a second electric means 20 to produce a second variable voltage dependent on engine torque. The voltage signal carrying information as to the engine torque increases with the engine torque and is applied to the neutral interval adjustment circuit 16 and the speed range indicating circuit, respectively, through lines 21 and 22. The second electric means 20 may be of the type which is disclosed in a U.S. Pat. No. 3,470,854 entitled "Fuel injection system for internal combustion engines". The neutral interval adjustment circuit 16 is thus responsive to the vehicle speed signal, the engine torque signal and the speed range indicating signal to generate a pulse signal, which in turn is applied to a command circuit 23 by way of a line 24. In response to the pulse signal the command circuit 23 controls the automatic transmission mechanism 10 so as to effect smooth down shift. The command circuit 23 is adapted to hold the automatic power transmission mechanism 10 in a neutral position for the duration of the pulse signal. The structure for effecting downshift is, for example, disclosed in our copending U.S. patent application as already mentioned and, accordingly, the detail description of the same is herein omitted.

Figure 2:
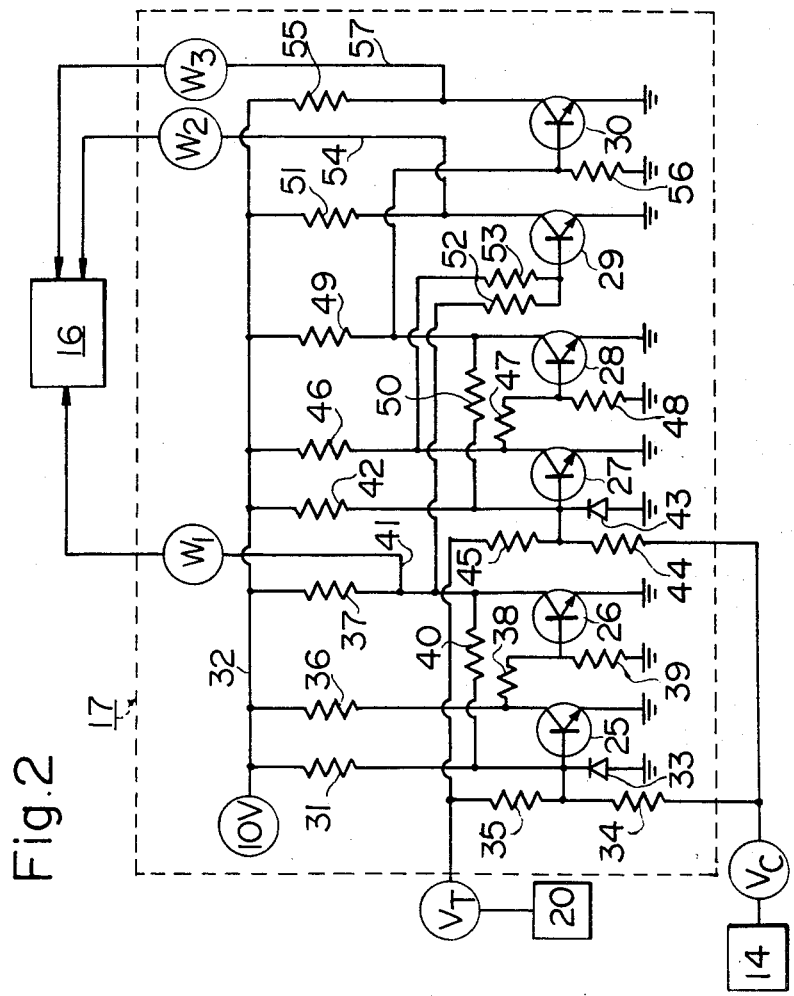
FIG. 2 is a wiring diagram of a speed range indicating circuit of the electronic control device shown in FIG. 1.

FIG. 2 shows an example of the speed range indicating circuit 17 of the present electronic control device. This indicating circuit 17 is composed of six transistors 25 to 30 and their associated electronic parts. The transistor 25 is connected at its base to a resistor 31 which in turn is connected to a bus line 32 of positive 10 volts. The base of the transistor 25 is grounded by way of a diode 33 which is polarized so that a negative potential is not established at the base of the transistor 25. The base of the transistor 25 is connected to the outputs of the first sensor 14 and the second sensor 20, respectively, through resistors 34 and 35. The collector of the transistor 25 is connected to the bus line 32 by way of a resistor 36. The emitter of the transistor 25 is connected directly to ground. The transistor 26 is connected at its collector to a resistor 37 which in turn is connected to the bus line 32. The base of the transistor 26 is connected via a resistor 38 to the collector of the transistor 25 and via a resistor 39 to ground. The emitter of the transistor 26 is connected directly to ground. A resistor 40 is connected between the base of the transistor 25 and the collector of the transistor 26. Connected at a point between the collector of the transistor 26 and the resistor 37 is a line 41 through which a signal $W_1$ indicating that the vehicle is running at a first speed is applied to the neutral interval adjustment circuit 16.

The transistor 27 is connected at its base to the bus line 32 by way of a resistor 42. The base of the transistor 27 is grounded by way of a diode 43 which is polarized so that a negative potential is not established on the base. The base of the transistor 27 is also connected to the first and second sensors 14 and 20, respectively, by way of resistors 44 and 45. The collector of the transistor 27 is connected to the bus line 32 by way of a resistor 46. The emitter of the transistor 27 is connected directly to ground. The collector of the transistor 27 is connected to the base of the transistor 28 by way of a resistor 47. The base of the transistor 28 is connected to ground by way of a resistor 48. The collector of the transistor 28 is connected via a resistor 49 to the bus line 32 and via a resistor 50 to the base of the transistor 27. The emitter of the transistor 28 is directly grounded.

The transistor 29 is connected at its collector to the bus line 32 by way of a resistor 51 and at its emitter directly to ground. The base of the transistor 29 is connected via a resistor 52 to the collector of the transistor 26 and via a resistor 53 to the collector of the transistor 27. Connected at a point between the collector of the transistor 29 and the resistor 51 is a line 54 through which a signal $W_2$ indicating that vehicle is running at a second speed is applied to the neutral interval adjustment circuit 16.

A transistor 30 is connected at its collector to the bus line 32 by way of a resistor 55. The base of the transistor 30 is connected via a resistor 56 to ground and directly to the collector of the transistor 28. The emitter of the transistor 30 is connected directly to ground. A line 57 is connected to the collector of the transistor 30 to derive a signal $W_3$ indicating that the vehicle is running at a third speed, the signal $W_3$ being also applied to the neutral interval adjustment circuit 16.

During first speed forward drive of the vehicle, a voltage $W_1$ is established on the line 41. Specifically, when the vehicle is running at a first speed, voltage output is applied from the first sensor 14 to the base of the transistor 25 through the resistor 34. Another voltage output is also applied from the second sensor to the base of the transistor 25 through the resistor 35. In addition to these two signals, a positive voltage is applied to the base of the transistor 25 by way of the resistor 31. When the potential of the base of the transistor 25 exceeds a predetermined value, the transistor 25 is rendered conductive. Consequently, the collector of the transistor 25 is at zero potential and hence the transistor 26 is rendered nonconductive because of the fact that the base thereof is connected to the collector of the transistor 25. This builds up a voltage signal $W_1$ on the line 41, which is indicating that the vehicle is running at a first speed. When the vehicle speed and the engine torque exceed a level at which a transition between the first and second speed range takes place, the transistor 25 is rendered nonconductive, causing the transistor 26 to become conductive, so that the voltage signal $W_1$ on the line 41 disappears.

The resistors 42, 44 and 45 are adjusted so that the transistor 27 cannot be rendered nonconductive until the vehicle speed and the engine torque reach a value at which a transition between the second and third speed ranges takes place. Thus, during the first and second speed forward drives, the transistor 28 having its base connected to the collector of the transistor 27 is rendered nonconductive. Hence, the transistor 30 having its base connected to the collector of the transistor 28 is rendered conductive. Then, a voltage signal $W_3$ does not appear on the line 57. As described above, when the vehicle speed and the engine torque exceed the value at which a transition between the first and second speed ranges takes place, the transistor 25 is rendered nonconductive, thereby causing the transistor 26 to become conductive. On the other hand, the transistor 27 remains conductive all this while. This will drop the potential at the base of the transistor 29 which is connected to the collectors of the transistors 26 and 27 by way of the resistors 52 and 53, so that the transistor 29 is rendered conductive. When the transistor 29 is rendered nonconductive, a voltage signal $W_2$ is fed to the line 54, which is indicating that the vehicle is running at a second speed.

As already described, when the vehicle speed and the engine torque exceed the value at which a transition between the second and third speed ranges takes place, the transistor 27 is rendered nonconductive with the resistors 42, 44 and 45 suitably selected, causing the transistor 29 to become conductive, so that the voltage $W_2$ on the line 54 disappears. Then, the transistor 28 having its base connected to the collector of the transistor 27 by way of the resistor 47 is rendered conductive, causing the transistor 30 having its base connected to the collector of the transistor 28 to become nonconductive. This will produce a voltage signal $W_3$ on the line 57. The operations of the six transistors 25 to 30 during the first, second and third speed ranges are shown in the following table.

| SPEED RANGE |
| --- |

| | | 1st | 2nd | 3rd |
|---|---|---|---|---|
| Transistor | 25 | | conductive | nonconductive | nonconductive |
| " | 26 | nonconductive → $W_1$ | conductive | conductive |
| " | 27 | conductive | conductive | nonconductive |
| = | 28 | nonconductive | nonconductive | conductive |
| " | 29 | conductive | nonconductive → $W_2$ | conductive |
| " | 30 | conductive | conductive | nonconductive → $W_3$ |

Figure 3:
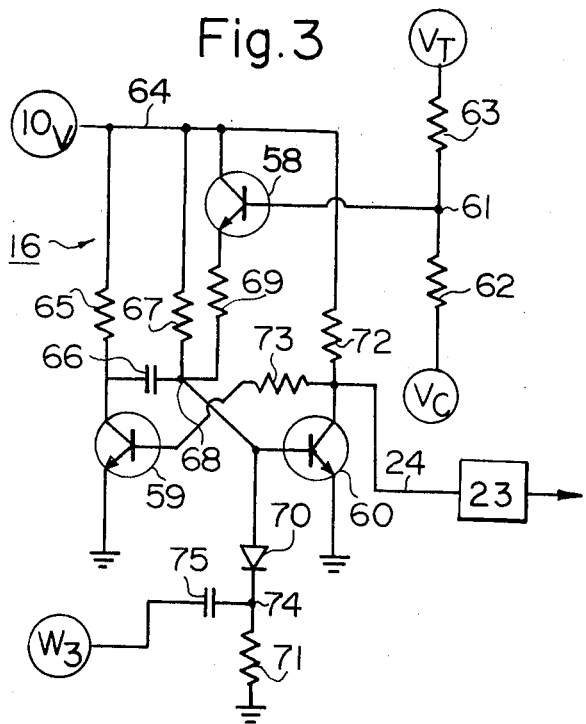
FIG. 3 is a wiring diagram of a neutral interval adjustment circuit of the electronic control device of FIG. 1.

FIG. 3 shows the neutral interval adjustment circuit 16 of the present electronic control device. The neutral interval adjustment circuit 16 is composed of three transistors 58, 59 and 60, of which the two transistors 59 and 60 form a monostable multivibrator together with their associated electronic parts.

The signal Vc carrying information as to the vehicle speed is applied to a point 61 by way of a resistor 62. Also applied to the point 61 by way of a resistor 63 is the engine torque signal Vt which is generated by the second sensor 20. The point 61 is electrically connected to the base of the transistor 58. The collector of the transistor 58 is connected to a bus line 64 of positive 10 volts.

The transistor 59 has its collector connected to the bus line 64 via a resistor 65 and its emitter connected directly to ground. The collector of the transistor 59 is also connected to the bus line 64 through serially connected capacitor 66 and resistor 67. Connected to a point 68 between the capacitor 66 and resistor 67 is a resistor 69 which in turn is connected to the emitter of the transistor 58. The point 68 is connected to the base of the transistor 60 and to a diode 70 which is grounded via a resistor 71. The emitter of the transistor 60 is connected directly to ground. The collector of the transistor 60 is connected via a resistor 72 to the bus line 64 and via a resistor 73 to the base of the transistor 59. The collector of the transistor 30 shown in FIG. 2 is electrically connected to a point 74 between the diode 70 and the resistor 71 by way of a capacitor 75, so that the speed range indicating signal such as $W_3$ is applied to the point 74. The output of the neutral interval adjustment circuit 16 is derived from the collector of the transistor 60 and is applied to the command circuit 23 by way of the line 24.

Figure 4:
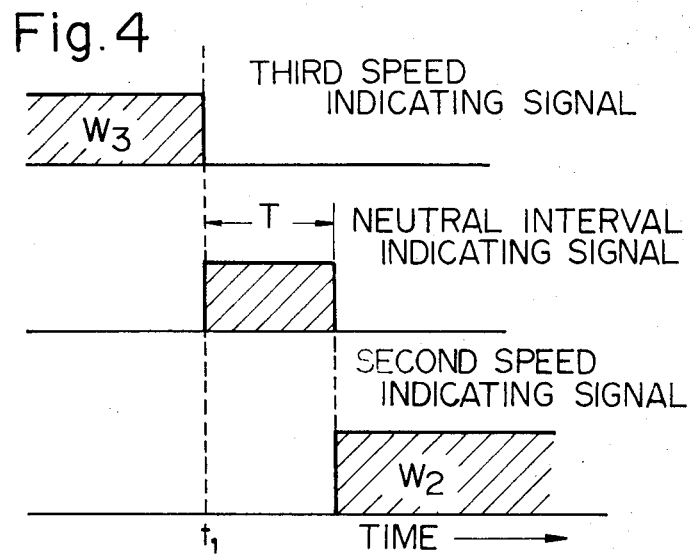
FIG. 4 is a schematic diagram showing a time relationship between second and third speed range indicating pulses and a neutral interval.

FIG. 4 shows a time relationship between the second and third speed range indicating pulses and neutral interval indicating pulse and will be used for explaining the operation of this invention. As shown, until a time $t_1$, the voltage signal $W_3$ is applied (FIG. 27 to the point 74 (FIG. 3) by way of the line 57 and the capacitor 75. Then, the transistor 60 is rendered conductive because of the fact that the base thereof is connected to the bus line 64 via the resistor 67. Thus, the output of the neutral interval adjustment circuit 16 which is connected to the collector of the transistor 60 is at zero potential.

When the vehicle speed drops below the value at which a transition between third and second speeds takes place, the voltage signal $W_3$ on the line 57 disappears, thereby causing a pulse of large negative voltage to be produced by the differentiating action of the capacitor 75 and the resistor 71. This will render the transistor 60 nonconductive, producing an output voltage signal having a width of T at the collector of the transistor 60. This signal is the neutral interval signal and is applied to the command circuit 23.

The positive potential at the collector of the transistor 60 is then applied to the base of the transistor 59 to render it conductive. As this occurs, the potential at the point 68 drops to zero as a result of discharging of the capacitor 66. Thereafter, the capacitor 66 is charged through a parallel circuit composed of the resistors 67 and 69 and of the resistance between the collector and emitter of the transistor 58. The charging time T is expressed as follows: $I \approx \approx 0.7 \times R \times C$ where $R$ = total resistance of the particular parallel circuit
$C$ = capacitance of the capacitor 66.

When the capacitor 66 is charged up, the transistor 60 having its base connected to the point 68 is rendered conductive, thus causing the output signal or the positive potential at the collector of the transistor 60 to disappear. It should be noted here that the output signal of the neutral interval adjustment circuit 16 is generated only during the charging time of the capacitor 66.

The voltage output of the first sensor 14 and the voltage output of the second sensor 20 are applied altogether to the base of the transistor 58 to modulate conductivity between the collector and emitter of the transistor 58. Then, the conductivity varies with the vehicle speed and the engine torque. More specifically, when the transistor 58 is nonconductive, the total resistance R is equal to the resistance of the resistor 67. However, as the potential at the base of the transistor 58 rises, the resistance R decreases inversely. As described above, the output of the second sensor or electric means 20 is a voltage which increases with the engine torque, while the output of the first sensor or electric means 14 is a voltage which decreases with increase in the vehicle speed. Thus, for the higher engine torque and the lower vehicle speed, the potential at the base of the transistor 58 increases. This causes the conductivity between the collector and emitter of the transistor 58 to increase, with the resultant reduction in the total resistance R. Therefore, the charging time T and accordingly the duration of the neutral interval decrease.

Figure 5:
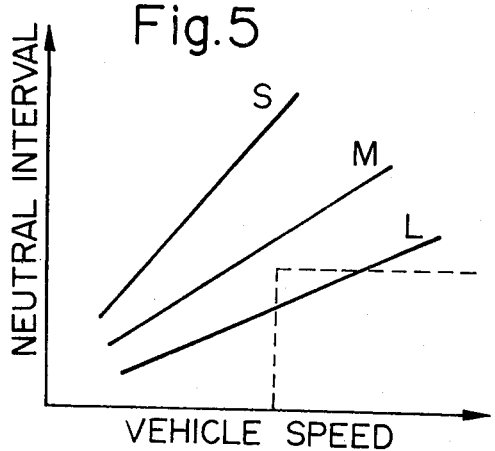
FIG. 5 is a graph showing a relationship between the neutral interval and vehicle speed.

FIG. 5 is a graph showing a relationship between the neutral interval T and the vehicle speed, in which straight lines S, M and L indicate the neutral intervals, respectively, for small intermediate and large engine torques. The dotted and step-shaped line represents, for the sake of comparison, the neutral interval obtained in a conventional automatic power transmission mechanism.

As has been described above, this invention provide a new and improved electronic control device for an automatic power transmission mechanism that is capable of adjusting the duration of the neutral interval so that a smooth down shift occurs at any particular vehicle speed and engine torque.

What is claimed is:

1. An electronic control device for effecting smooth downshift in an automatic transmission of an engine driven vehicle, the transmission providing forward first, second and third speed ratios and said electronic control device comprising, in combination, first electric means to produce a first variable voltage inversely dependent on vehicle speed; second electric means for producing a second variable voltage dependent on engine torque; comparing means electrically connected to said first and second electric means and responsive to said first and second variable voltages for producing speed ratio indicating voltages representing a first speed ratio, a second speed ratio and a third speed ratio in dependence on the relative values of said first and second variable voltages; a neutral interval adjustment circuit electrically connected to said comparing means and responsive to a change of said third speed ratio indicating voltage and said second speed ratio indicating voltage so as to produce a pulse signal, said neutral interval adjustment circuit also being electrically connected to said first and second electric means and responsive to said first and second variable voltages so as to increase the duration of said pulse signal when said first variable voltage decreases and to decrease said duration of said pulse signal when said second variable voltage increases; and a command circuit electrically connected to said neutral interval adjustment circuit and responsive to said pulse signal to cause said automatic transmission to shift to a neutral condition for the duration of said pulse signal for smooth downshift during said neutral condition.

2. An electronic control device according to claim 1, wherein said neutral interval adjustment circuit comprises a first transistor connected at its base to a junction point on a line connecting said first and second electric means and a monostable multivibrator adapted to produce said pulse signal in response to said change from said third speed ratio indicating voltage to said second speed ratio indicating voltage, said first transistor being connected at its emitter to an input of said monostable multivibrator and controlling the duration of said pulse signal in response to the relative values of said first and second variable voltages.

3. An electronic control device according to claim 2, wherein said monostable multivibrator comprises a capacitor and a parallel circuit consisting of a first and a second resistor of said monostable multivibrator and of the resistance between the collector and emitter of said first transistor, said resistance being modulated in response to the relative values of said first and second variable voltages to vary the total resistance of said parallel circuit resulting in variation in the charging time of said capacitor and accordingly also in variation in the duration of said pulse signal, the charging time T being expressed by the formula as follows:

$$T = 0.7 \times R \times C,$$

wherein $R$ represents total resistance and $C$ represents capacitance of said capacitor.

4. An electronic control device according to claim 3, wherein said monostable multivibrator is connected to a source of d.c. power and said comparing means, said monostable multivibrator being responsive to said third speed ratio indicating voltage being cut off.

* * * * *